United States Patent [19]
Gotoh

[11] Patent Number: 6,123,841
[45] Date of Patent: *Sep. 26, 2000

[54] WASTE-WATER FILTRATION AND PURIFICATION DEVICE FOR FISH CULTIVATION

[75] Inventor: Fumihiro Gotoh, Kawasaki, Japan

[73] Assignee: Ryubi Company Ltd., Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/979,534

[22] Filed: Nov. 26, 1997

[30] Foreign Application Priority Data

| Nov. 28, 1996 | [JP] | Japan | 8-317477 |
| Dec. 27, 1996 | [JP] | Japan | 8-350415 |
| Feb. 14, 1997 | [JP] | Japan | 9-030944 |
| Jul. 2, 1997 | [JP] | Japan | 9-176688 |

[51] Int. Cl.[7] ............................ A01K 63/00; B01D 33/46
[52] U.S. Cl. .................. 210/169; 210/205; 210/252; 210/391; 210/396; 119/227
[58] Field of Search .................. 210/791, 107, 210/169, 391, 205, 393, 394, 396, 252, 403, 408, 413, 416.2; 119/259, 226, 227, 260, 261

[56] References Cited

U.S. PATENT DOCUMENTS

| 521,591 | 6/1894 | Lynn . |
| 600,392 | 3/1898 | Bowden . |
| 2,372,445 | 3/1945 | Morgan . |
| 2,576,470 | 11/1951 | May . |
| 3,055,208 | 9/1962 | Gallus . |
| 3,643,806 | 2/1972 | O'Cheskey . |
| 3,784,017 | 1/1974 | Arnold et al. . |
| 3,959,140 | 5/1976 | Legras . |
| 4,298,268 | 11/1981 | Sato et al. . |
| 4,346,007 | 8/1982 | Norman et al. . |
| 4,818,402 | 4/1989 | Steiner et al. . |
| 4,876,013 | 10/1989 | Shmidt et al. . |
| 5,164,079 | 11/1992 | Klein . |
| 5,176,100 | 1/1993 | Fujino . |
| 5,370,791 | 12/1994 | Lescovich et al. . |
| 5,520,808 | 5/1996 | Stoneburner et al. . |
| 5,558,042 | 9/1996 | Bradley et al. . |

FOREIGN PATENT DOCUMENTS

| 0 457 641 | 11/1991 | European Pat. Off. . |
| 0 742 038 | 11/1996 | European Pat. Off. . |

*Primary Examiner*—David A. Simmons
*Assistant Examiner*—Fred Prince
*Attorney, Agent, or Firm*—Helfgott & Karas, P.C.

[57] ABSTRACT

A waste-water filtration device for fish cultivation comprises a thin rotatable filter material through which waste water flows from the inside surface to the outside surface, a removing means which comprises a brush on either of the inside or outside surfaces for relatively scraping the inside and outside surfaces of said rotatable filter material, and a drive assembly which comprises a power supply means and a bearing means to drive the rotatable filter material whereby the rotatable filter is cleaned by removing the waste matter which adheres to said filter material.

4 Claims, 15 Drawing Sheets

WASTE-WATER FILTRATION AND PURIFICATION DEVICE FOR FISH CULTIVATION

DETAILED DESCRIPTION OF THE INVENTION

1. Field of the Invention

This invention relates to a waste-water filtration device for fish cultivation used in pre-processing waste-water before cleaning the waste-water that has been polluted by fish excretions, remaining feed, fallen leaves and the like, and a waste-water purification device for fish cultivation wherein the waste-water filtration device is connected to a waste-water processing tank.

2. Prior Art

In conventional fish-cultivation waste-water purification devices, the waste water is removed from the pond where the fish are being raised, and supplied to the device from a supply inlet. The waste water is then is filtered by a filter on the bottom of the device, and all of the solid material in the waste water adheres to the bottom filter, or it settles and accumulates on the bottom of the tank. The filtered waste water then flows to and passes through a drainage outlet and is returned to the aforementioned pond. The solid matter that settles and accumulates on the bottom of the tank is then suitably removed. Air for aeration is blown in from an air diffuser ducts located on the bottom of the tank and supplies oxygen to the aerobic bacteria which adheres to the filter, and the waste water is biologically treated by this aerobic bacteria.

However, in this kind of waste-water purification device for fish cultivation, as the amount of time for treating the waste water increases, the efficiency of cleaning the waste water decreases, and even rate of operation of the purification device is increased, the efficiency of waste-water purification is not increased by much. In other words, in the conventional waste-water purification device for fish cultivation, it is easy for the load to greatly increase. Therefore, together with cleaning the tanks of the waste-water purification device for fish cultivation and reducing the load on the purification device, it is necessary to improve the efficiency of purification.

However, when cleaning the tanks of the aforementioned conventional waste-water purification device for fish cultivation, flow of waste water to each of the tank is stopped and a long time is required. Moreover, the tanks must be cleaned frequently. Furthermore, as a result of the aforementioned cleaning, the amount of time available for treating the waste water is reduced, and there is the problem that the processability of the waste water is reduced. As the processability of the waste water is reduced, ammonia remains in the recycled water, and this is dangerous for the cultivated fish.

SUMMARY OF THE INVENTION

Therefore, taking the aforementioned problems into consideration, the objective of this invention is to provide waste-water purification device for fish cultivation that has simple construction and that makes it more difficult for the load on the device to increase and decreases the frequency at which cleaning must be performed. Furthermore, it recycles the water making it safe for the cultivated fish.

PREFERRED EMBODIMENTS OF THE INVENTION

Figure 1:
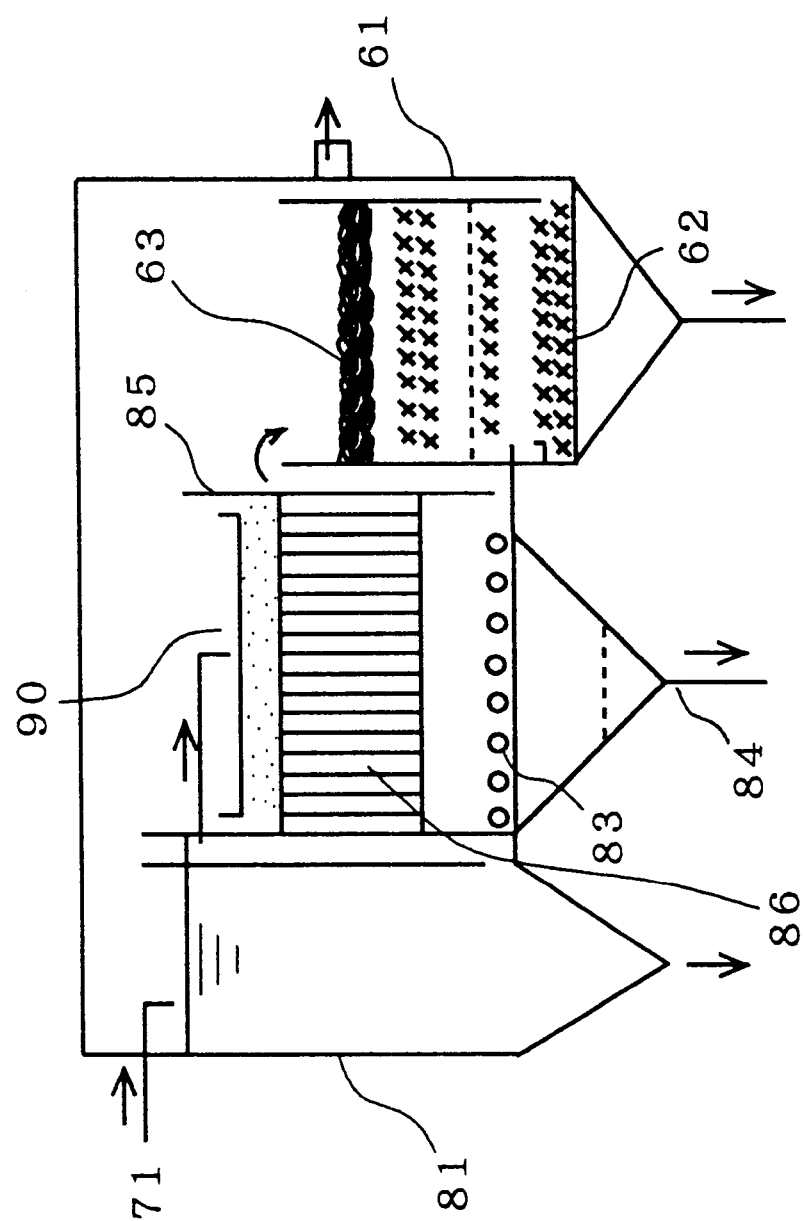
FIG. 1 is a vertical cross-sectional drawing showing a preferred embodiment of the waste-water main processing device of the waste-water purification device for fish cultivation of this invention.

FIG. 1 is a vertical cross-sectional view showing the waste-water purification tank of this invention. In FIG. 1, the waste water to be processed flows smoothly through the waste water inlet into a settlement tank 81, an aerobic bacteria processing tank 85 and a composition adjustment tank 61, which are arranged in that order, and the water level between each layer is adjusted so that it becomes progressively lower. Waste water, such as that of a pond for fish cultivation, is fed for circulating through pipes 71, and after it settles in the settlement tank 81, the processed water flows to a sprinkler 90, where it drips into or flows down into an aerobic bacteria processing tank 85. This processed water which is processed by dripping or spraying absorbs oxygen from the atmosphere.

The processed water for circulating which is processed in the settlement tank 81 and the aerobic bacteria processing tank, sometimes lacks in minerals necessary for the fish, and since the amount of dangerous nitric acid it contains may be more than the allowable level, there is a composition adjustment tank 61 located downstream of the aerobic bacteria processing tank 85.

In the composition adjustment tank 61, in order to supply minerals such as calcium to the processed water for circulating which was processed in the aerobic bacteria processing tank 85, coral 62 is immersed in the tank, and in order to lower the amount of nitric acid, water plants 63 are allowed to grow in the tank.

In the sprinkler 90, depending on the amount of processed water for circulating, it is desirable that several holes with a diameter of 1 mm to 20 mm be formed in a receiving pan or pipe from which the processed water is dripped or sprayed. The sprinkler 90 can be omitted if not required. Also, it is possible to use pumps between tanks for feeding the processed water.

It is desirable that the aerobic bacteria filtering tank 85 is prepared with living conditions favorable to forming a colony of loaches. The aerobic bacteria filtering tank 85 is filled with a long fibrous filter media 86 having very many short folds or pleats connected around the body string, and the processed water flows down through it and enters in overflow into the composition adjustment tank 61. There is still waste matter in the processed water which enters into the composition adjustment tank 61, and when this matter settles, the water flowing downward promotes settlement of the matter. However, the direction of flow of the processed water can be either up or down.

The fibrous filter media 86 used can be a thread-shaped contactor material (such as BIO-LOOP, manufactured by Kuriha Chemical Co., Ltd., or DIPLA CLEO-COAT and CLEO-COAT, manufactured by Dai Nippon Plastics, Ltd.), or slime purification tape (such as that manufactured by Nippon Rika, Ltd.). The material should be, for example, polyvinylidene chloride.

For thread-shaped contactor material, for example, the thread diameter is 0.1 mm in the short folds or pleats, and the body string length of 200 mm, and the fibrous filter media is wound vertically with spacing of about 10 to 20 mm so the loaches can move up and down between them. However, it can also be extended in the horizontal direction. If the spacing is too large, however, biological processing of the water will become insufficient.

In the discharge portion and moving portion of the processed water, mesh is installed to prevent the loaches from being drained out.

In the composition adjustment tank 61, in order to supply minerals such as calcium to the water for fish cultivation that was processed and passed through the aerobic bacteria filtration tank 85, coral and garnet 62 are immersed in the tank, and in order to reduce the amount of nitric acid, water plants are floated on the water.

It is desirable that air-diffuser pipes 83 are arranged at the bottom of the aerobic biological filtration tank 85. When air-diffuser pipes 83 are used, overall moderate aeration is desired. If it is too much, it will destroy the living environment of the loaches.

The thread-shaped contactor material 86 used in the filter media should be gentle to the loaches, and should sway due to the movement of the loaches. Moreover, the slime that adheres to the contactor material 86 is shaken off the contactor material 86 a little at a time by the constant movement of the loaches. As a result, too much slime does not accumulate on the contactor material 86, and the biological processing by the contactor material 86 is performed smoothly. In addition, an anaerobic condition caused by an accumulation of excessive slime does not occur in the contactor material 86. If an anaerobic condition occurs, ammonia and hydrogen sulphide is produced, and even if small amounts of these get into the processed water, it could be very dangerous for the cultivated fish.

Furthermore, so that the slime on the bottom of the filtration tank 85 slides and falls off easily, it is desirable that the bottom is slanted, however, even if this done it is easy for slime to accumulate. Therefore, if it is made so that the loaches can enter, as the loaches move across the bottom of the tank, it stirs up the slime on the bottom of the tank and the slime is moved toward the drainage device 84. As a result, it is possible to prevent the generation of an anaerobic condition caused by the accumulation of slime on the bottom of the tank. The number of loaches should be 5 to 15 loaches per 200 liters of water.

Figure 2:
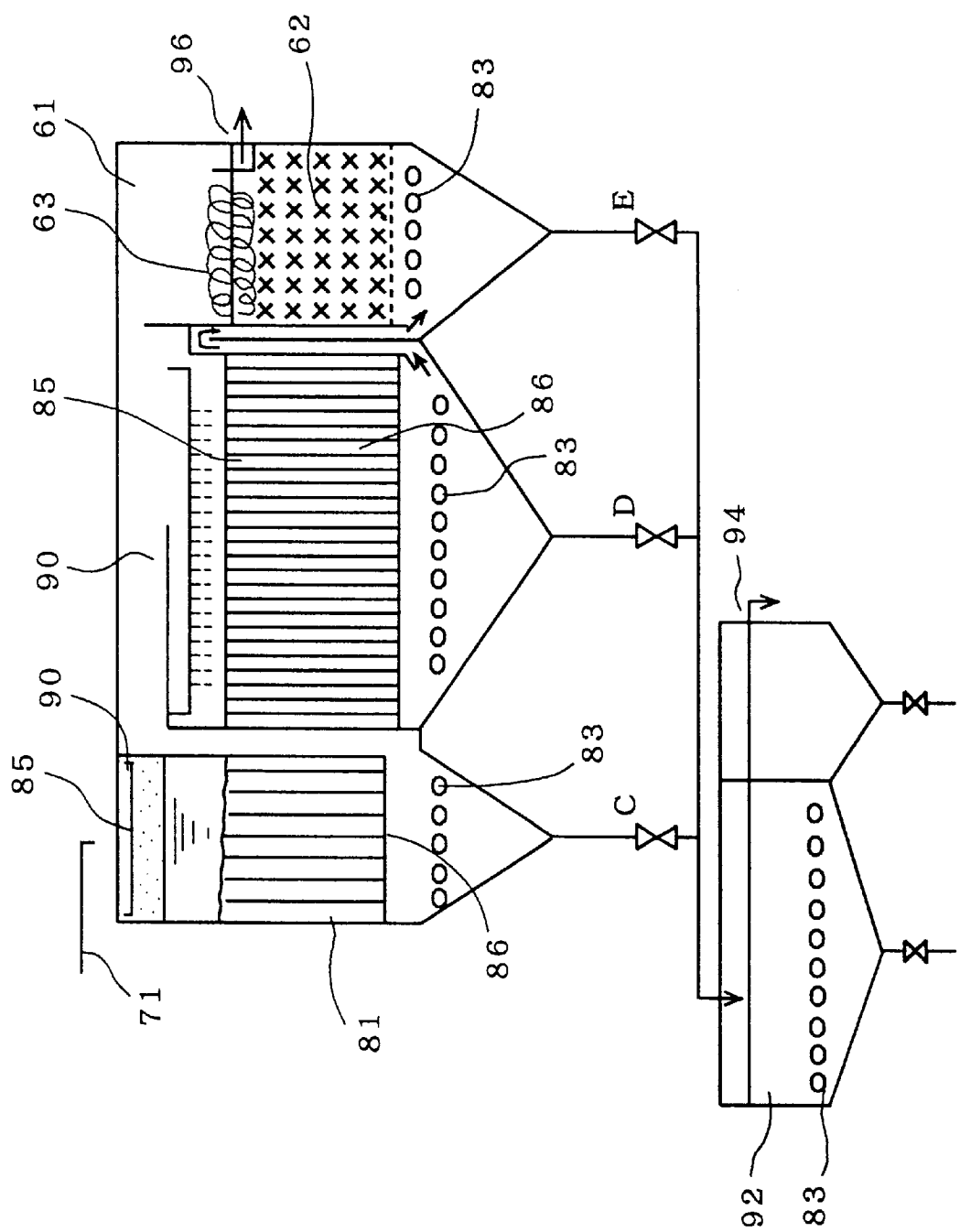
FIG. 2 is a vertical cross-sectional drawing showing a preferred embodiment of the waste-water purification device of this invention.

FIG. 2 is a vertical sectional drawing showing another preferred embodiment of the waste-water purification tank for fish cultivation of this invention. In the embodiment shown in FIG. 2, a first aerobic biological processing tank 81, a second aerobic biological processing tank 85 and a composition adjustment tank 61 are arranged. Adjustment of the water level between each layer and the construction of the sprinkler device 90 are the same as described above in FIG. 1.

Furthermore, there is a drainage water processing tank 92. Circulating waste water (processed water), such as that of a pond for fish cultivation, flows through the pipes 71 to the sprinkler device 90, where it then drips or flows down into the first aerobic biological processing tank 81. This processed water that drip or flows down into the tank is capable of absorbing oxygen from the atmosphere. However, the sprinkler device 90 can be omitted.

The filter media 86 of the first aerobic biological processing tank 81 is very coarse. The processed water flows along the flow path from the first aerobic biological processing tank 85 into the sprinkler device 90 of the second aerobic biological processing tank 85. The second aerobic biological processing tank 85 is filled with fibrous contactor material 86, and the processed water flows down through this contactor material and flows into the bottom of the composition adjustment tank 61.

It is desired to help supply oxygen to the water by arranging air-diffuser pipes 83 at the bottom of both the first and second aerobic biological processing tanks 81, 85, and to perform backwash through the contactor material 86.

In the composition adjustment tank 61, with the air flow through the air-diffuser pipes 83, the water flows up through a mineral source such as coral or garnet, and then the processed water is returned to the fish-cultivation pond through a drainage outlet 96.

There are valves, C, D and E located at the bottom of the first aerobic biological processing tank 81, second aerobic biological processing tank 85 and composition adjustment tank 61, respectively, and they make it possible to remove the settled waste matter and send it to the drainage processing tank 92.

The processed water can be sent from the second aerobic biological processing tank 85 in over-flow to the top of the water surface of the composition adjustment tank 61.

In the waste-water purification device for fish cultivation of this invention, the frequency that the waste-water processing device must be cleaned is greatly reduced. In addition, with the filter or contactor material installed, it keeps down the amount of new water that must be used, making it possible to perform cleaning in a short amount of time.

Figure 3:
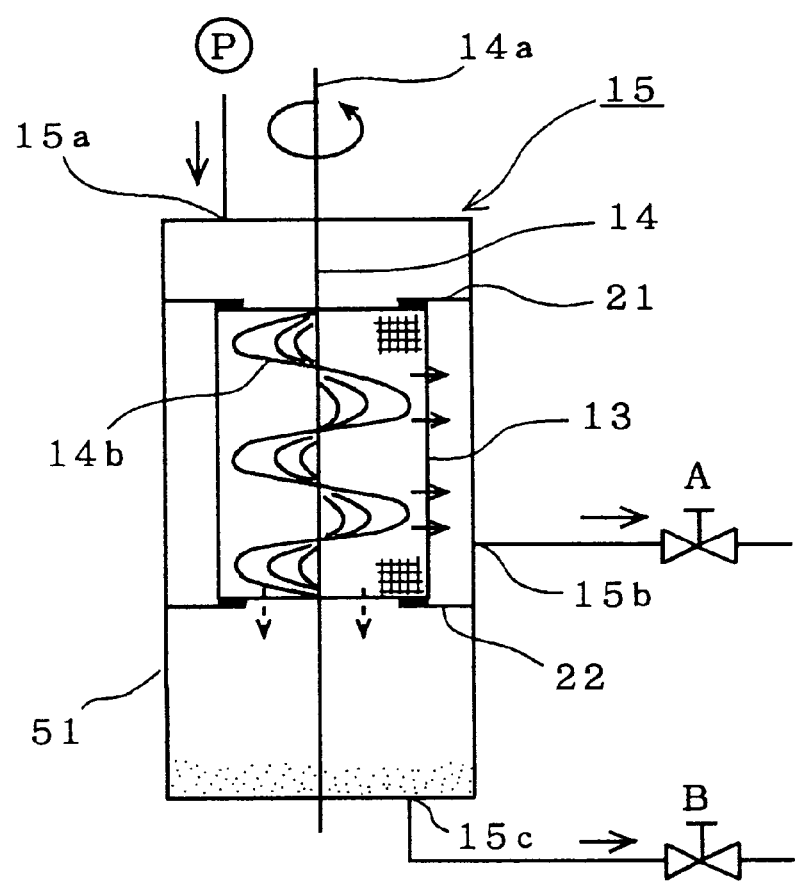
FIG. 3 is a vertical cross-sectional drawing showing a first embodiment of the waste-water filtration device according to the present invention.

FIG. 3 is a vertical cross-sectional diagram showing a first embodiment of the waste-water filtration device 15 of this invention. The first embodiment, shown in FIG. 3, comprise: (1) filter or mesh material 13, for example 40 to 200 pitch wire mesh, which is hollow and cylindrical in shape and which has two support rings 21, 22 on the top and bottom sides to prevent it from moving up or down, (2) a scraper 14 comprising a rotating shaft 14a around which there is installed a spiral blade 14b, and this rotating shaft 14a fits inside the filter or mesh material 13 and is fixed so it is concentric with the axis of the filter or mesh material 13, and which can be driven and rotated by a motor. These members are housed in a container 51 which is connected to a pump P.

In this waste-water filtration device 15, waste water (processed water) is fed through the inlet 15a by a pump P, then it passed through the support ring 21 and through the inside of the filter or mesh material 13 (refer to the solid arrows), then after it passes to the outside of the filter or mesh material 13, it drained through the outlet 15b of the waste-water filtration device and through valve A. The matter that adheres to the inner surface of the filter or mesh material 13 is scraped by the rotating scraper 14, then passes through the support ring 22 and settles on the bottom of the waste-water filtration device 15 (refer to the dashed arrow). The matter that settles on the bottom of the waste-water filtration device 15 is then removed through the removal outlet 15c located on the bottom, and then through valve B.

It is necessary to prevent the waste water from not passing through filter or mesh material 13 and passing between the support ring 21 and the filter or mesh material 13, however, if the space between the support ring 21 and the filter or mesh material 13 overlap, then matter fills into that space and creates a seal. In the same way, it is okay for the support ring 12 and the filter or mesh material 13 to overlap.

Figure 4:
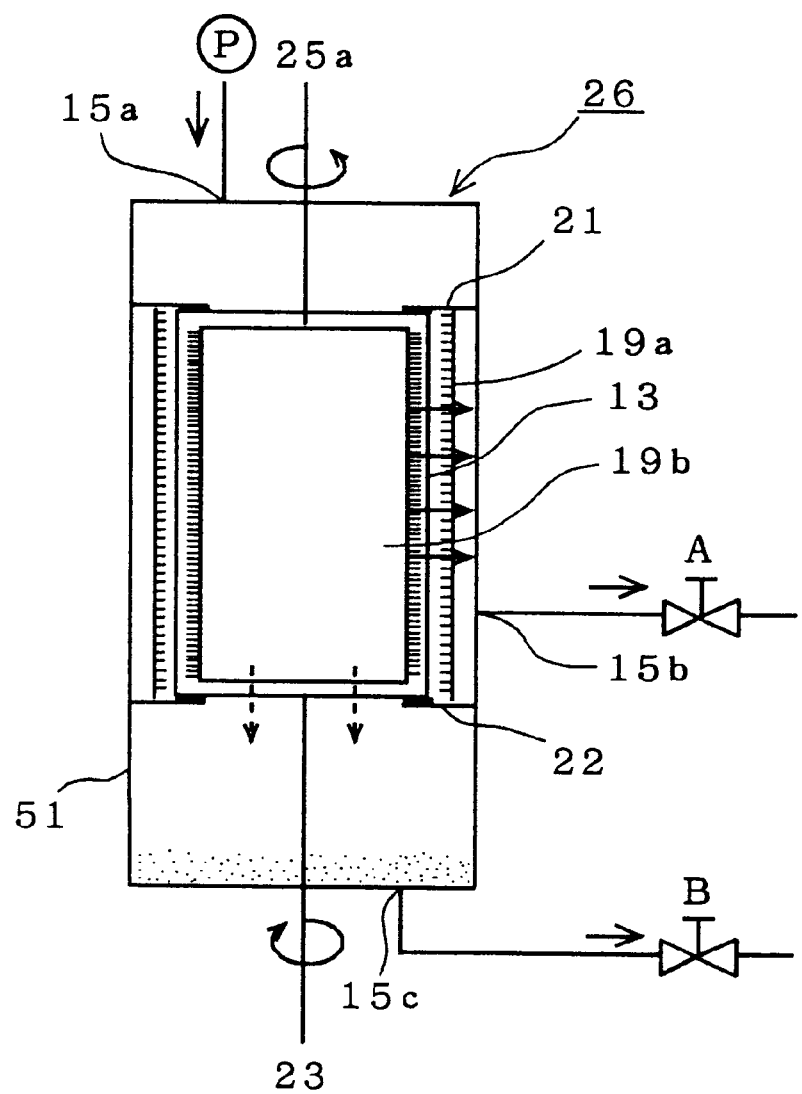
FIG. 4 is a vertical cross-sectional drawing showing a second embodiment of the waste-water filtration device.

FIG. 4 is a vertical cross-sectional drawing showing a second embodiment of the waste-water filtration device, which comprises: (1) filter or mesh material 13, for example 400 to 200 pitch wire mesh, that is hollow and cylindrical in shape, and which has support rings 21, 22 on the top and bottom to prevent it from moving up and down, and which can be driven and rotated by a motor as a rotating shaft 23, (2) a non-rotating outer brush 19a that is hollow and cylindrical in shape and fits around the filter material 13 and which is concentric with the shaft 23 of the filter material 13 and fixed to the support rings 21, 22, (3) a rotating inner brush 19b which extends through the filter or mesh material 13, and is driven and rotated by a motor around a rotating shaft 25a is fixed so that it is coaxial with the shaft 23 of the filter or mesh material 13. Waste water is fed to this waste-water filtration device 26 through inlet 15a by a pump P, and it passes through the support ring 21 and through the inside of the filter or mesh material 13 (refer to the solid arrow) to the outside, then it passes through the outlet 15b of the waste-water filtration device 26 and is drained from valve A.

Figure 5:
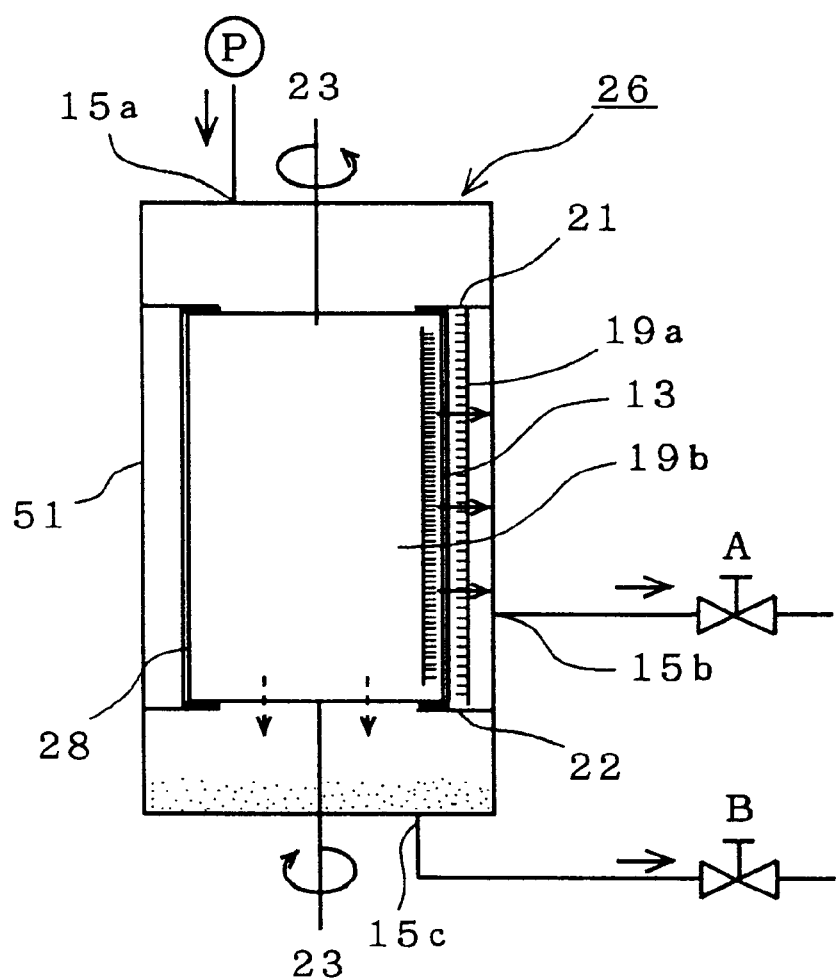
FIG. 5 is a vertical cross-sectional drawing showing a third embodiment of the waste-water filtration device.

FIG. 5 is a vertical cross-sectional drawing showing a third embodiment of the waste-water filtration device of this invention, which comprises a filter or mesh material 13, for example 400 to 200 pitch wire mesh, that is hollow and cylindrical in shape, and which has support rings 21, 22 on the top and bottom to prevent it from moving up and down, and which can be driven and rotated by a motor through a rotating shaft 23. A thin metal sheet 28 scattered with holes having a diameter of 3 to 8 mm overlaps the wire mesh in order to support it, and an outer brush 19a and inner brush 19b made of nylon are vertically extended and fixed at one location around the aforementioned wire mesh 13 in the circumferential direction.

Waste water is fed into this waste-water filtration device 26 through inlet 15a by a pump P, and then passes through the support ring 21 and through the inside of the filter or mesh material 13. After it passes to the outside, it then flows through the outlet 15b of the waste-water filtration device 26 and then drained from valve A.

In FIGS. 4 and 5, the matter that adheres to the inner surface of the filter or mesh material 13 is brushed by the inner brush 19b, and the matter that sticks out from the outer surface of the filter or mesh material 13 is brushed by the outer brush 24. This matter that has been brushed off passes from the inside of the filter or mesh material 13 and through the support ring 22, and then settles on the bottom of the waste-water filtration device 26. The matter that settles on the bottom of the waste-water filtration device 26 is then removed from the bottom through the removal outlet 15c located on the bottom, and then removed through valve B.

The operation sequence is as follows. That is, during normal operation, pump P and valve A are open and valve B is closed. During washing, pump P and valve A close, and after valve B opens, pump P opens. After washing is finished, pump P and valve B close and valve A opens, then pump P opens and normal operation begins.

Figure 6:
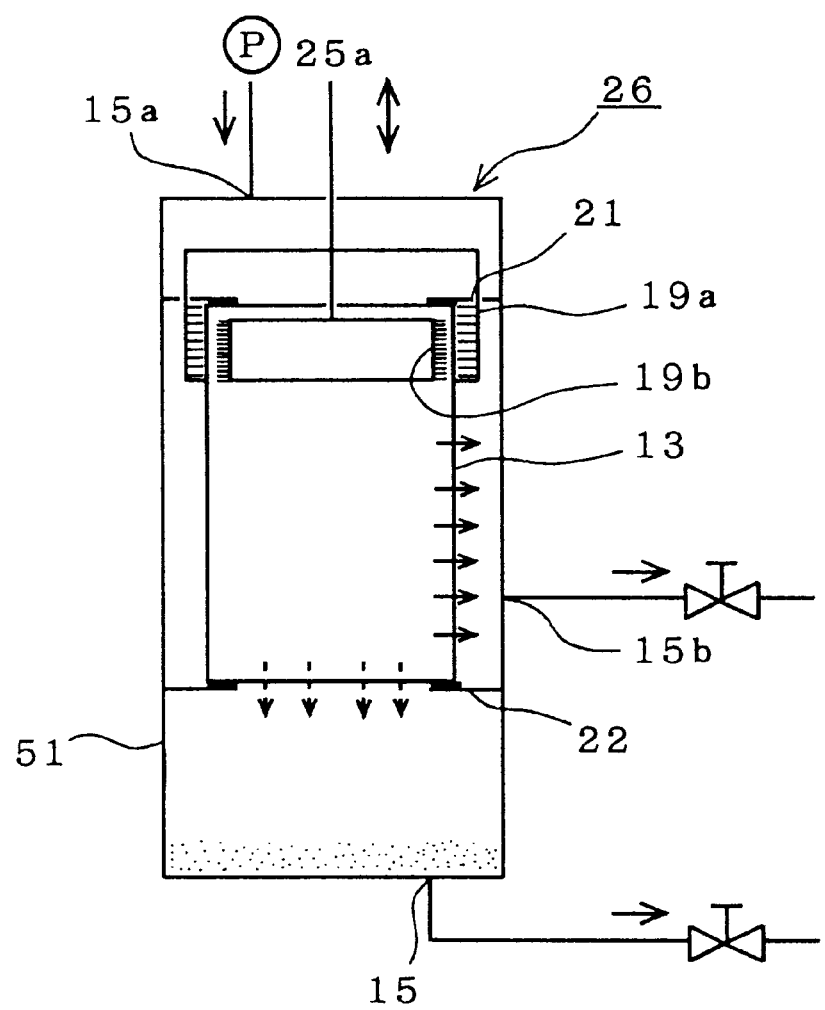
FIG. 6 is a vertical cross-sectional drawing showing a fourth embodiment of the waste-water filtration device.

In the embodiments above, the filter material and brushes rotate with respect to each other, however, it is also possible to move them with respect to each other in the axial direction. This case (fourth embodiment) is shown in FIG. 6. The inner brush 19b and outer brush 19a are fixed to shaft 25a, and shaft 25a is moved in the axial direction with respect to the filter material 13 with a stroke as shown by the arrows.

In this invention, the aforementioned waste-water filtration device is used as a pre-processing device for the waste water, and it greatly reduces the load on the waste-water processing tank. Moreover, it greatly reduces the frequency of cleaning the waste-water processing tank. Furthermore, with the filter material mounted in the waste-water pre-processing device, as described above, new water does not need to be used and thus it is possible to clean using waste-water in less time. Therefore, the waste-water purification device of this invention greatly reduces the frequency of time-consuming cleaning, and makes it possible to greatly improve the efficiency of processing the waste water.

Figure 7:
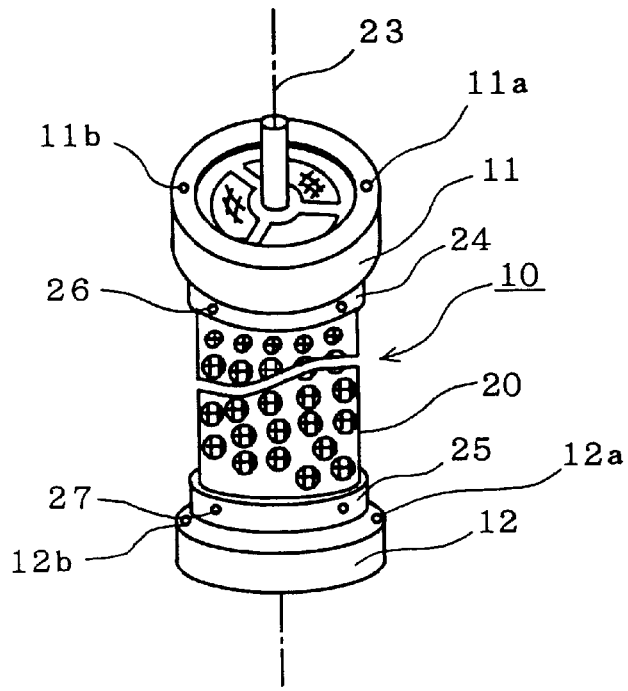
FIG. 7 is a partial pictorial drawing showing an embodiment of the waste removal device of this invention.
Figure 8:
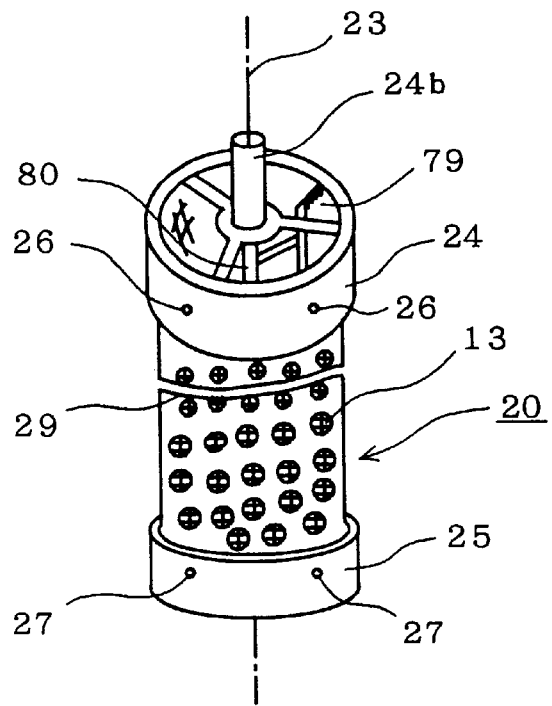
FIG. 8 is a partial pictorial drawing showing the filter unit of the waste removal device of FIG. 7.
Figure 9A:
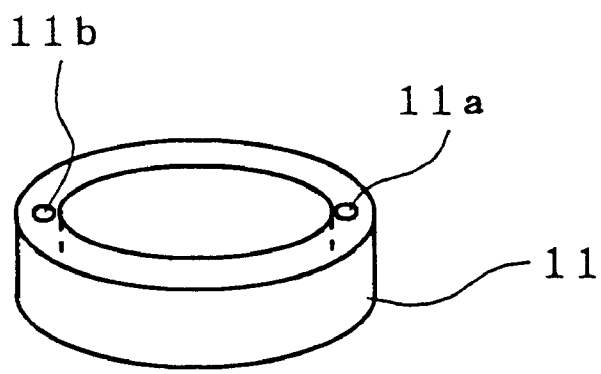
FIG. 9(a) is a pictorial drawing and cross-sectional drawing of the first filter support of the waste removal device of FIG. 7.
Figure 9B:
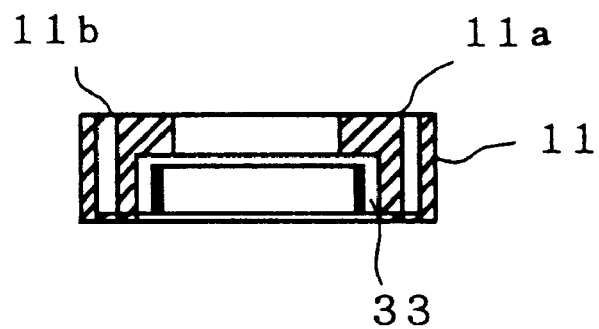
FIG. 9(b) is a cross sectional view of the filter support of FIG. 9(a)
Figure 10A:
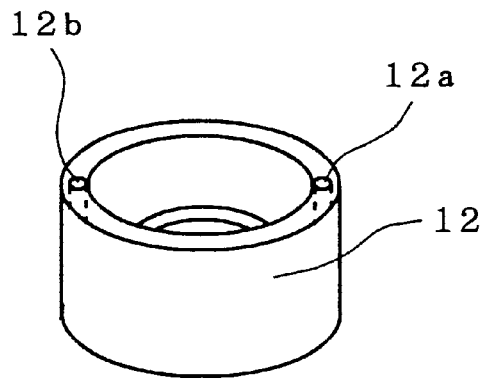
FIG. 10(a) and FIG. 10(b) are pictorial drawings cross-sectional drawing of the second filter support of the waste removal device of FIG. 7.
Figure 10B:
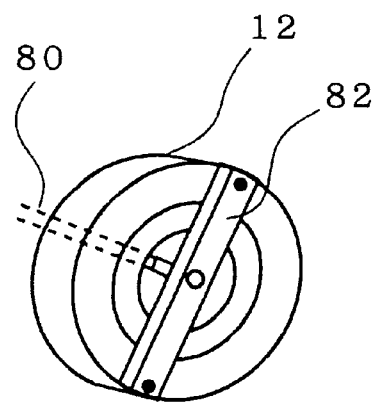
Figure 10C:
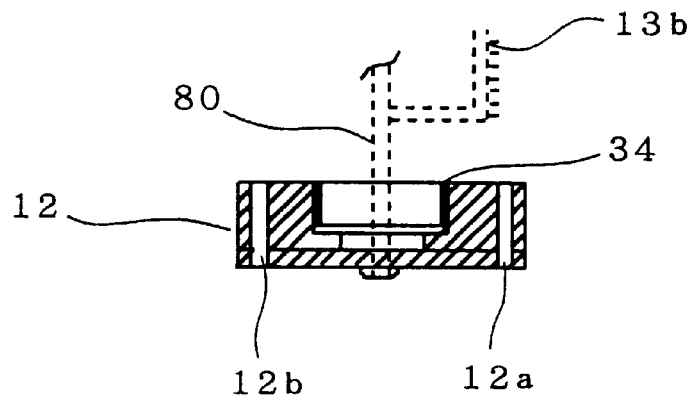
FIG. 10(c) is a cross-sectional drawing of the second filter support of the waste removal device of FIG. 7.
Figure 11:
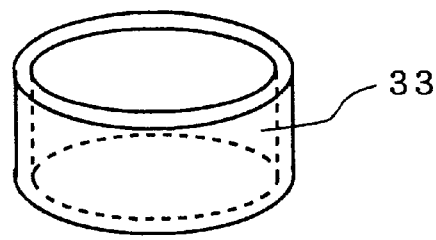
FIG. 11 is a pictorial drawing of the filter bearing of the waste removal device of FIG. 7.
Figure 12:
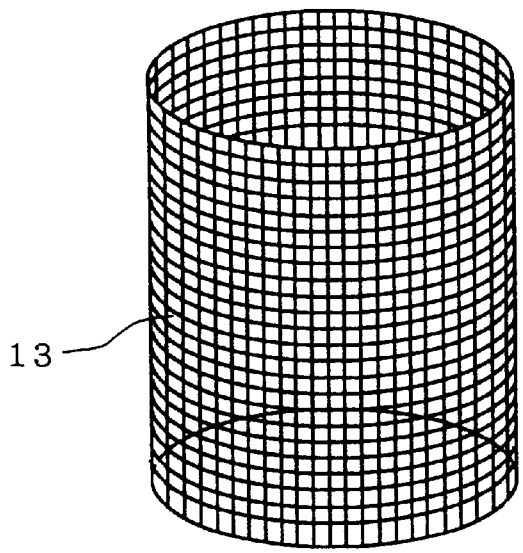
FIG. 12 is a pictorial drawing of the filter material of the waste removal device of FIG. 7.
Figure 13:
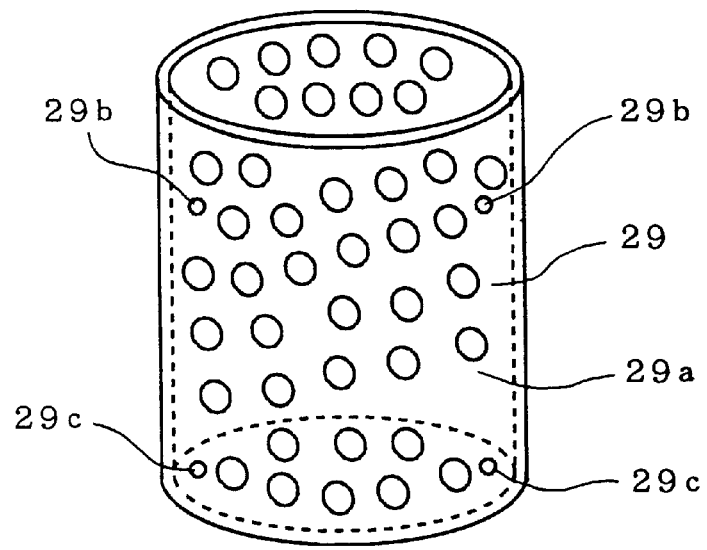
FIG. 13 is a pictorial drawing of the filter-material protection member of the waste removal device of FIG. 7.
Figure 14A:
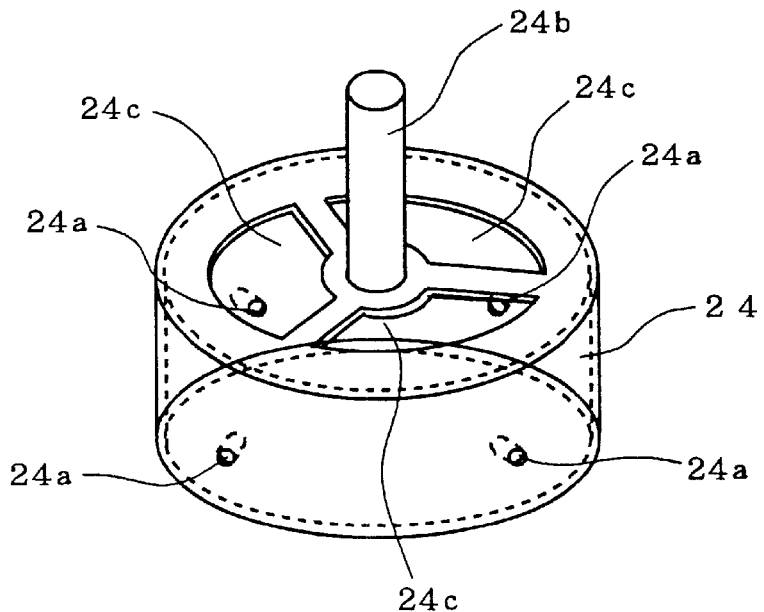
FIG. 14(a) is a pictorial drawing cross-sectional partial drawing of the motor-side end member of the waste removal device of FIG. 7.
Figure 14B:
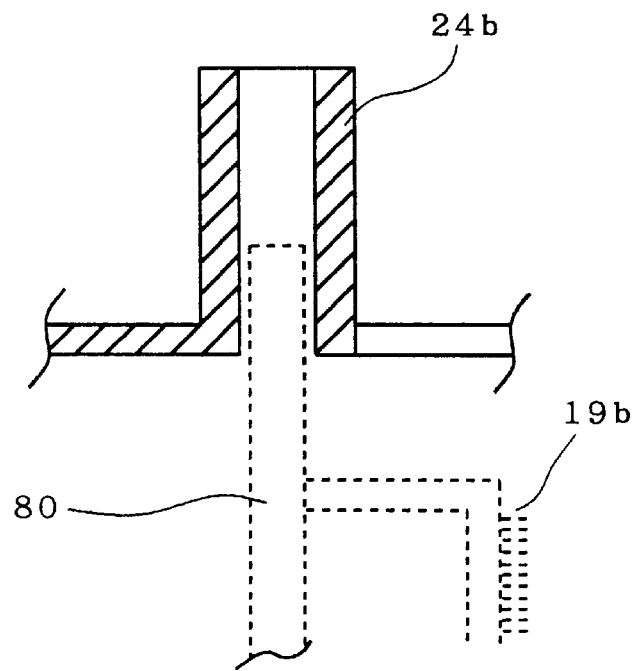
FIG. 14(b) is a cross-sectional partial drawing of the motor-side end member of the waste removal device of FIG. 7.
Figure 15:
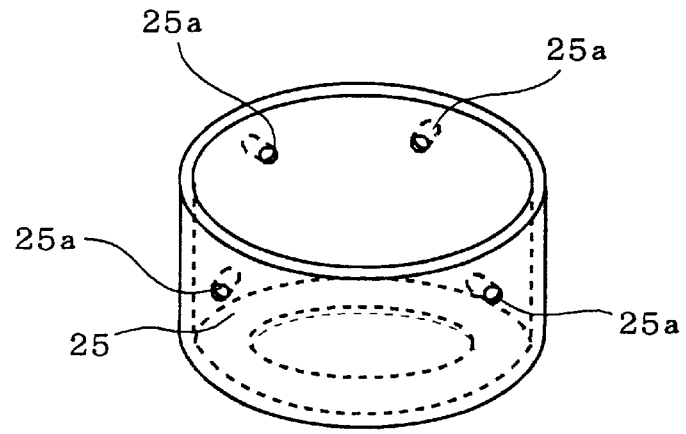
FIG. 15 is a pictorial drawing of the non-motor-side end member of the waste removal device of FIG. 7.

FIG. 7 is a partial pictorial view showing an embodiment of the waste-water filtration device (the container 51 is removed) as in FIG. 5, and it shows the top and bottom at different angles. FIGS. 8 thru 15 are pictorial views of the components which comprise the waste-water filtration device shown in FIG. 7. That is, FIG. 8 shows a filter unit. FIG. 9(a) and FIG. 9(b) show a first filter support. FIGS. 10(a) to (c) show a second filter support. FIG. 11 shows a first filter bearing. The second filter bearing is the same (not shown in the figures). FIG. 12 shows the filter material. FIG. 13 shows the protective material for the filter material. FIG. 14(a) and FIG. 14(b) show the end member on the motor side. And FIG. 15 shows the end member on the non-motor side. FIGS. 7 and 8 are partial pictorial views, and they show the top and bottom at different angles.

The waste-water filtration device (except container) 10 that is shown in FIG. 7 comprises a cylindrical-shaped filter unit 20 that is capable of rotating around a center axis 23, a stationary cylindrical-shaped (ring-shaped) first filter support 11 and a stationary cylindrical-shaped (ring-shaped) second filter support 12, and a non-rotating, cylindrical-shaped (ring-shaped) first filter bearing 33 and a non-rotating, cylindrical-shaped (ring-shaped) second bearing 34 (see FIG. 18 described later), where the center axes of the filter unit 20, first and second filter supports 11, 12, and first and second filter bearings 33, 34 all coincide with the center axis 23.

In order for the filter unit 20 to be capable of protecting the cylindrical-shaped filter material 13 (see FIG. 12) and maintaining the shape of the filter material 13, it comprises a cylindrical-shaped filter-material protection member 29 that goes around the filter or mesh material 13 (see FIG. 13), a cylindrical-shaped motor-side end member 24 (see FIG. 14) which attaches to the motor side end of the protection member, and a cylindrical-shaped non-motor-side end member 25 (see FIG. 15) which attached to the other side end of the protection member, and where the center axes of filter or mesh material 13, filter-material protection member 29, motor-side end member 24, and the other side end member 25 coincide with the center axis 23. In other words, the filter unit 20 comprises a filter or mesh material 13 as shown in FIG. 12 that fits inside a protection member 29 as shown in FIG. 13, and an end member 24 as shown in FIG. 14(a) that fits over one end, and another end member as shown in FIG. 15 that fits over the other end. The filter or mesh material 13 (see FIG. 12) is made of 40 to 100-pitch wire mesh. Also, the filter-material protection member 29 (see FIG. 13) is made of a thin sheet metal scattered with several holes 29a having a hole diameter of 3 to 8 mm. On the cylindrical side of the filter-material protection member screw holes 29b for the screws which fasten the filter-material protection member 29 to the motor-side end member 24, and screw holes 29c for the screws which fasten the non-motor-side end member 25 to the filter-material protection member 29 are formed. Furthermore, in order that the filter unit 20 is capable of rotating around the center axis 23, on top of the cylindrical portion of the motor-side end member 24, a motor coupling shaft 24b, which connects to the drive shaft of the motor M (see FIG. 20 described later), is fixed to the end member 24 by connecting members (three in FIG. 14(a)), and forms three waste-water passages 24c. It is possible to have two, four or more waste-water passages 24c.

On the cylindrical surface of the motor-side end member 24, screw holes 24a for the screws which fasten the filter-material protection member 29 to the motor-side end member 24 are formed, and on the cylindrical surface of the non-motor-side end member 25, screw holes 25a for the screws which fasten the filter-material protection member 29 to the other side end member 25 are formed.

As shown in FIG. 14(b), the motor coupling shaft 24b is hollow, and is open where it connects to the aforementioned connecting members of the end member 24, and the end of the rod member 80 for installing the inner brush, which is described later, is inserted into this opening.

Figure 19:
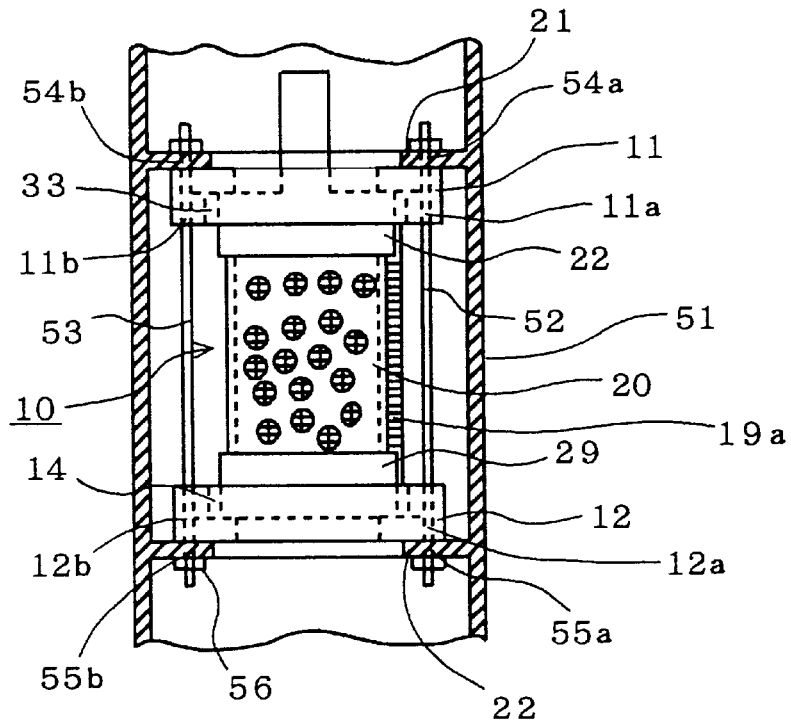
FIG. 19 is a partial cross-sectional drawing showing the installation condition of waste-water passage attached to the waste removal device of FIG. 7.

In the waste-water filtration device 10 described above, the first filter support 11 (FIG. 9) and second filter support 12 (FIG. 10) are formed with through holes 11a, 11b, 12a, 12b which run parallel to the center axis 21 through the walls of the first filter support 11 and second filter support 12, and are used for attaching the first and second filter supports 11, 12 to a container 51 as shown in FIG. 19 or a special passage. By inserting both ends of a rod member through the holes 11a (11b) and 12a (12b) and securing the ends with a bolt or the like, everything is made into single unit. When doing this, it is possible to extend the outer brush 19a between the first filter support 11 and second filter support 12, and to attach it to this. As shown in FIG. 19, two through holes each are formed but it is also possible to use just one or even three or more.

The motor-side end member 24 (see FIG. 14(a)) of the filter unit 20 is inserted into a first filter bearing (oilless seal) 33 of the first filter support 11, and the other side end member 25 (see FIG. 15) of the filter unit 20 is inserted into a second filter bearing (oilless seal) 34 of the second filter support 12.

On one side of the second filter support 12, a fixture 82 (FIG. 10(b)) is mounted for attaching one end of the rod member 80 which is provided with the inner brush 13b.

Figure 18:
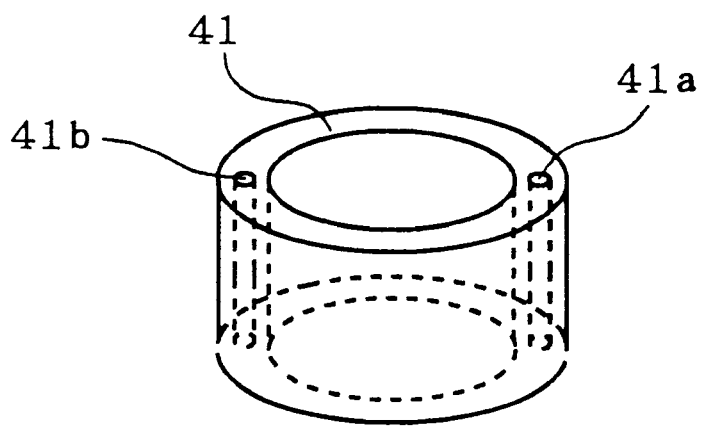
FIG. 18 is a pictorial drawing of the first integrated filter support and bearing of the waste removal device of this invention.

The first filter bearing 33 and second filter bearing 34 fit between the motor-side end member 24 of the filter unit 20 and the first filter support 11, and between the other side end member 25 of the filter unit 20 and the second filter support 12, respectively (see FIG. 18).

The filter bearings 33, 34 are made of bearing metal such as bronze or Babbit's metal, and they act as an oilless seal. In addition, the brushes are e.g. nylon and can be cut to lengths of 8 mm for example.

Figure 16:
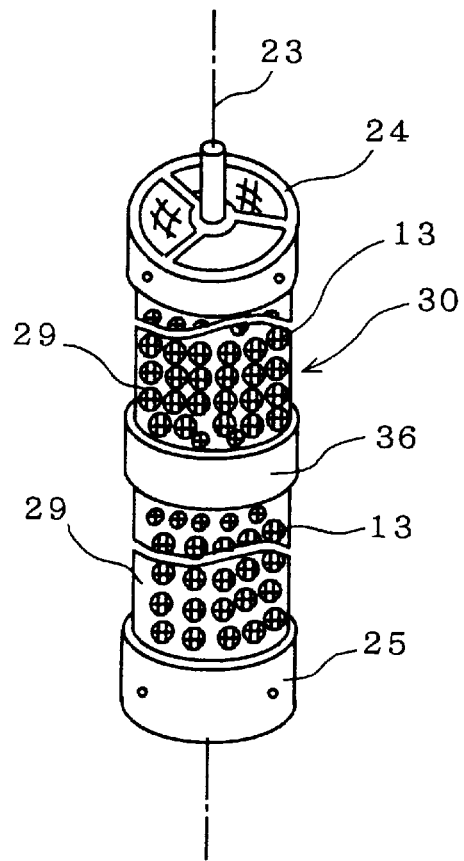
FIG. 16 is a partial pictorial drawing showing another embodiment of the filter unit of the waste removal device of this invention.

FIG. 16 is a partial pictorial drawing showing another embodiment of the filter unit of the waste-filtration device, where the top and bottom are shown at different angles. Here, two filter units are joined together by a sleeve 36.

Figure 17:
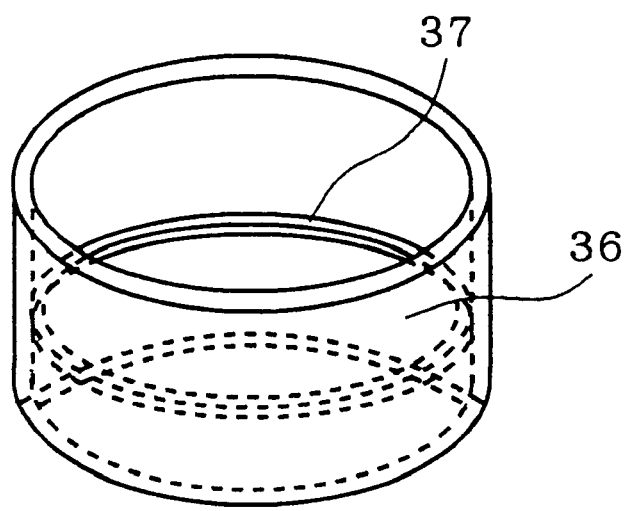
FIG. 17 is a pictorial drawing of the sleeve of the filter unit of FIG. 16.

FIG. 17 is a pictorial drawing of the sleeve which joins the two filter units shown in FIG. 16.

The filter units 30 shown in FIG. 16 have filter or mesh materials 13, and filter-material protection members 29. Moreover, both of the filter-material protection members 29 have the same center axis 23. In addition, located between the adjacent filter-material protection members, there is a sleeve 36 whose center axis is center axis 23, and supports the filter-material protection members 29 by a flange 37. The other members of the units are the same as for filter unit 20. It is also possible to use more than two cylindrical filter units.

Incidentally, the support and bearing can be formed into one unit using organic resin. In other words, in order to combine the function of the filter supports 11, 12 with the function of the filter bearings 33, 34, synthetic resin, for example nylon, is used to form an integrated first filter support and bearing and second filter support and bearing (not shown in the figure).

The filter unit shown in FIG. 8 is assembled as described below. That is, filter-material protection member 29 fits over the filter or mesh material 13, the motor-side end member 24 (other end member 25) fits over the motor side end (non-motor side end) of the filter-material protection member 29, and filter-material protection member 29 is fastened to the motor-side end member 24 and the non-motor side end member 25 using screws 26, 27.

The assembly of filter unit 30, shown in FIG. 16, is the same as that of filter unit 20, shown in FIG. 8, except that there is a sleeve 36 between both of the filter-material protection members 29.

FIG. 19 is a partial cross-sectional drawing showing the installation of the waste-water filtration device 10 to the container 51, which will become the passage for the waste-water. In one embodiment, the container 51 has a pipe shape with an inner diameter of 76 mm, and with the inlet 61 and outlet 62 reduced to an inner diameter of 38 mm.

For example, in the filter unit 20 assembled as described above, the first filter support 11 fits on the motor-side end member 24 so that the first filter bearing 33 can fit between the motor-side end member 24 and the first filter support 11.

Next, bars 52 with threads on both ends are passed through the through holes 11a, formed in the first filter support 11, and the through holes 12a, formed in the second filter support 12. Then the two ends of the bars 52 are inserted into the holes 54a formed in the support rings 21 and 22 which are attached to the container 51, and secured using nuts 56. It is also possible to secure them with welds instead of nuts.

Figure 20:
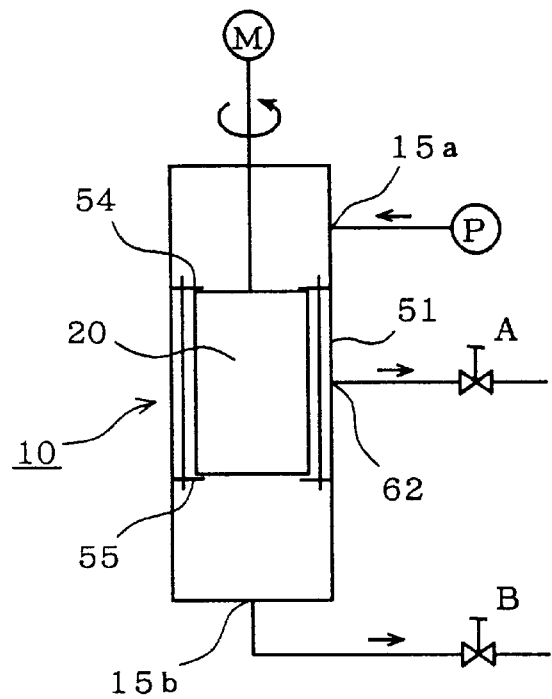
FIG. 20 is a vertical cross-sectional drawing showing an application of the waste removal device of FIG. 7.

The waste-water filtration device attached to the waste-water passage, is used as described below in FIG. 20.

Waste water is fed by a pump P through the inlet 15a to the waste-water filtration device 10, and then after it passes through the filter unit 20, it is drained through valve A from the outlet 15b of the container 51. When cleaning the waste matter that has accumulated on the filter unit 20, the motor coupling 24b (see FIG. 14a) on the motor-side end member 24 is coupled with a motor M, and the filter unit 20 is rotated. The waste matter adhering to the inner surface of the filter or mesh material 13 is brushed off by the inner brush 19b, and the waste matter that sticks out from the outer surface of the filter or mesh material 13 is brushed off by the outer brush 19a. This waste matter that has been brushed off from the filter unit 20, drops down on the bottom of the passage 51.

The settled waste matter is then removed through valve B from the removal outlet 15b. When performing cleaning as described above, it is okay to feed waste water from the pump P (valve A is open) or to not feed waste water (valve A is closed). It is not desirable for the removed waste matter to be drained as is to the sewage, so it is best if it is broken down biologically by aerobic or anaerobic processing beforehand. The waste-water filtration device of this invention, as described above, has simple construction, and it makes it possible to easily remove the waste matter in a short period of time without having to stop the waste-water processing and with the waste matter adhering to the filter material as is without having to use new water. In addition, by changing the dimensions of the overall device, it is possible to remove small objects from the waste water such as fish excretion, or large objects such as fallen leaves.

EXAMPLES

The waste-water filtration and purification device for fish cultivation of this invention was used for purifying pond water of a pond for carp, and after processing the waste water at a rate of 50 liters per minute, the processed water was returned to the pond as in Example 1 and Example 2. The processing of waste water was tested for 100 days. In all of the tests below, the transparency of the pond water were all good, and no abnormalities were seen in living conditions of the carp.

Example 1

Figure 21:
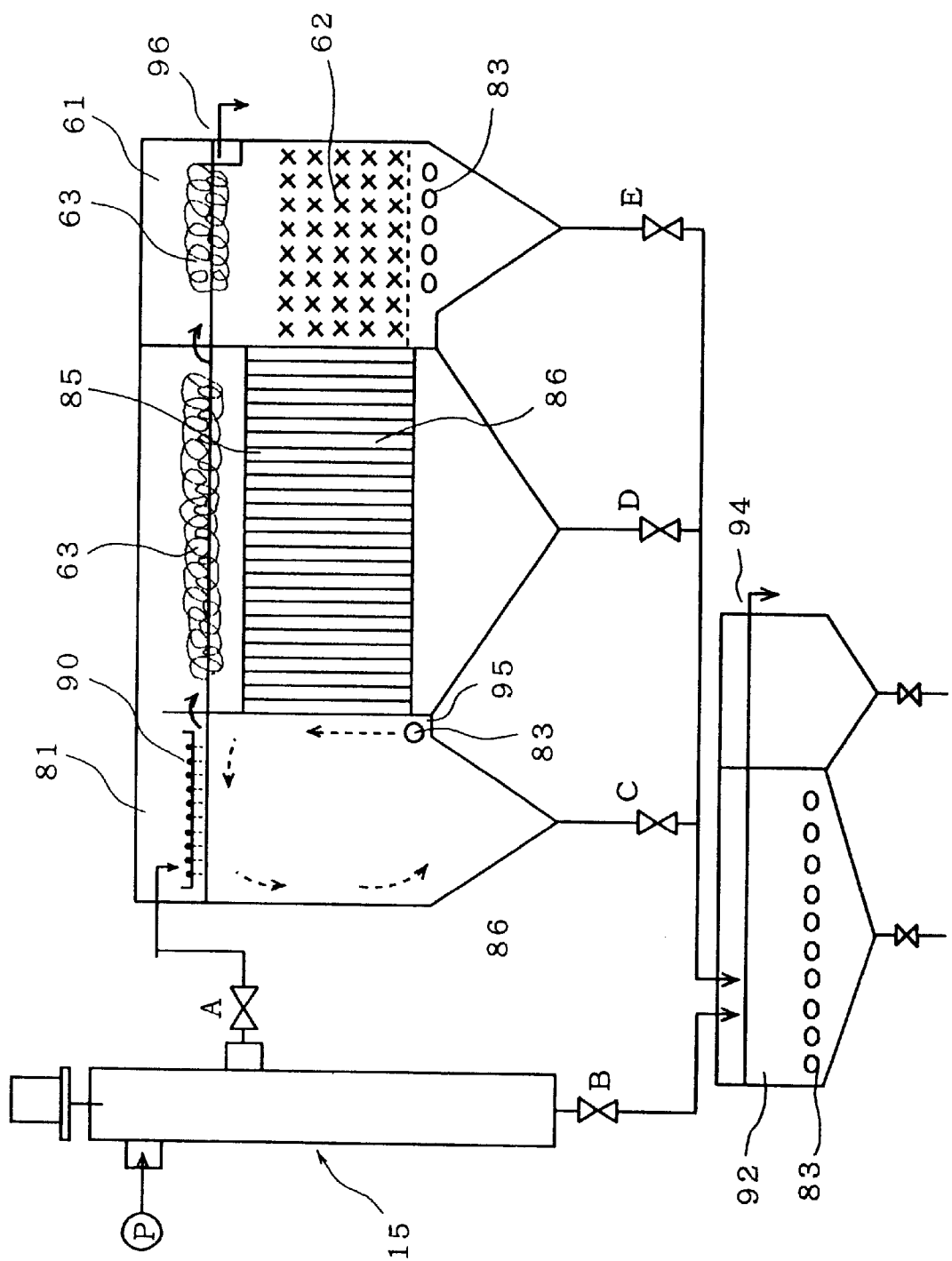
FIG. 21 is an outline drawing showing the assembly of the waste-water filtration device and waste-water purification tank.

As shown in FIG. 21, the waste-water purification device for fish cultivation comprised of the waste-water filtration device for fish cultivation shown in FIG. 5 (Outer diameter: 500 mm, Length: 1 m) and the waste-water processing tank, was used. As a result, the frequency of cleaning of the tested processing device (number of days of continuous waste-water processing between one cleaning) and the average required time for one cleaning were approximately 30 days and 30 minutes, respectively. In this test, cleaning of the filter material using the scraper of the waste-water filtration device for fish cultivation shown in FIG. 5, was performed on an average of once per day for approximately 10 minutes per each cleaning.

Example 2

The waste-water filtration device for fish cultivation shown in FIG. 3 (Outer diameter: 500 mm, Length: 1 m) was used in the place of FIG. 5, and the test was performed the same as in example 1. In this test, the frequency and time for cleaning the filter material using the inner brush of the waste-water filtration device for fish cultivation shown in FIG. 3 was the same as that for the scraper in example 1. Also, cleaning of the filter material using the outer brush was performed on an average of once every two days for approximately 10 minutes for each cleaning. After this test, a very small amount of waste matter remained adhered to the filter material of the waste-water filtration device for fish cultivation shown in FIG. 3, however it was easily removed with a small amount of clean water.

What is claimed is:

1. A waste-water filtration device for fish cultivation comprising a thin filter material formed in a cylindrical-hollow shape with inside and outside surfaces, through which waste water flows from the inside surface to the outside surface, waste removing means comprising an outer brush and an inner brush provided touching both the brushes on the inside surface of the filter material and the outside surfaces of the filter material, respectively, and a rotating drive assembly comprising a power supply means and a bearing means to rotate the filter material so as to clean the rotatable filter material, removing the waste matter which adheres to the inside surface of the filter material with the inner brush and removing the waste matter which adheres to the outside surface of the filter material with the outer brush.

2. The waste-water filtration device of claim 1, which is used as a preliminary waste-water processing device in combination with a waste-water process tank system to constitute a waste-water purification device.

3. The waste-water filtration device of claim 2, wherein the waste-water processing tank system includes an aerobic bacteria processing tank which contains a filter media and an air diffuser.

4. The waste-water filtration device of claim 2, where the waste-water processing tank system includes a composition adjustment tank to supply the processed water with minerals and to lower an amount of nitric acid in the processed water.

* * * * *